United States Patent
Singh

(10) Patent No.: US 9,810,221 B2
(45) Date of Patent: Nov. 7, 2017

(54) MACHINE FOR GENERATING ELECTRICAL ENERGY

(71) Applicant: Deere & Company, Moline, IL (US)

(72) Inventor: Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 708 days.

(21) Appl. No.: 13/849,759

(22) Filed: Mar. 25, 2013

(65) Prior Publication Data

US 2014/0286802 A1 Sep. 25, 2014

(51) Int. Cl.

| | | |
|---|---|---|
| *F02B 63/04* | (2006.01) | |
| *F03G 7/08* | (2006.01) | |
| *F04D 13/02* | (2006.01) | |
| *A01D 41/12* | (2006.01) | |
| *A01D 69/02* | (2006.01) | |
| *H02K 7/18* | (2006.01) | |
| *F03G 3/04* | (2006.01) | |
| *G01F 1/10* | (2006.01) | |
| *H02K 11/04* | (2016.01) | |
| *H02K 16/00* | (2006.01) | |

(52) U.S. Cl.
CPC ......... *F04D 13/02* (2013.01); *A01D 41/1217* (2013.01); *A01D 69/02* (2013.01); *F03G 3/04* (2013.01); *G01F 1/10* (2013.01); *H02K 7/1823* (2013.01); *H02K 11/046* (2013.01); *H02K 16/00* (2013.01)

(58) Field of Classification Search
None
See application file for complete search history.

(56) References Cited

U.S. PATENT DOCUMENTS

| | | | | |
|---|---|---|---|---|
| 3,771,531 | A | * | 11/1973 | Scribner .......................... 460/23 |
| 2007/0029799 | A1 | * | 2/2007 | Shimizu et al. .............. 290/1 A |
| 2010/0237626 | A1 | | 9/2010 | Hamner |

FOREIGN PATENT DOCUMENTS

| | | |
|---|---|---|
| AU | 2004100026 A4 | 2/2004 |
| DE | 2501321 A1 | 7/1976 |
| JP | 2010252742 A | 11/2010 |
| WO | WO2006084192 A1 | 8/2006 |

OTHER PUBLICATIONS

Machine Translation of CN 2465822.*
Extended European Search Report, dated Jun. 25, 2015, regarding Application No. EP14156147.2, 6 pages.

* cited by examiner

*Primary Examiner* — Tulsidas C Patel
*Assistant Examiner* — Thomas Quigley
(74) *Attorney, Agent, or Firm* — Yee & Associates, P.C.

(57) ABSTRACT

In accordance with one embodiment, a machine for generating electrical energy comprises a housing and a shaft rotatable with respect to the housing. An impeller has blades for rotation with the shaft in response to receipt of material from a chute. A first generator assembly comprises first stator windings associated with the housing and a first magnet affixed to the shaft, such that if the impeller rotates an electromagnetic signal energizes the first stator windings based on the flow of material through the chute.

20 Claims, 2 Drawing Sheets

US 9,810,221 B2

MACHINE FOR GENERATING ELECTRICAL ENERGY

FIELD OF THE INVENTION

This disclosure relates to a machine for generating electrical energy, such as a machine that is capable of generating electrical energy from the motion of harvested material.

BACKGROUND

A harvester (e.g., combine) harvests crops, plants, or other materials to yield harvested material. In some prior art, the harvested material is discharged from a chute of a harvester (e.g., combine) to transfer the harvested material to a storage container, cart or other place. Various sensors or other electrical loads on the harvester require electrical energy for operation. Thus, there is a need or opportunity to provide a machine for generating electrical energy from the motion of harvested material.

SUMMARY OF THE INVENTION

In accordance with one embodiment, a machine (e.g., alternator) for generating electrical energy comprises a housing and a shaft rotatable with respect to the housing. An impeller has blades for rotation with the shaft in response to the receipt of material from a chute. A first generator assembly comprises first stator windings associated with the housing and a first magnet affixed to the shaft, such that if the impeller rotates an electromagnetic signal energizes the first stator windings based on the flow of material through the chute.

DESCRIPTION OF THE PREFERRED EMBODIMENT

Figure 1:
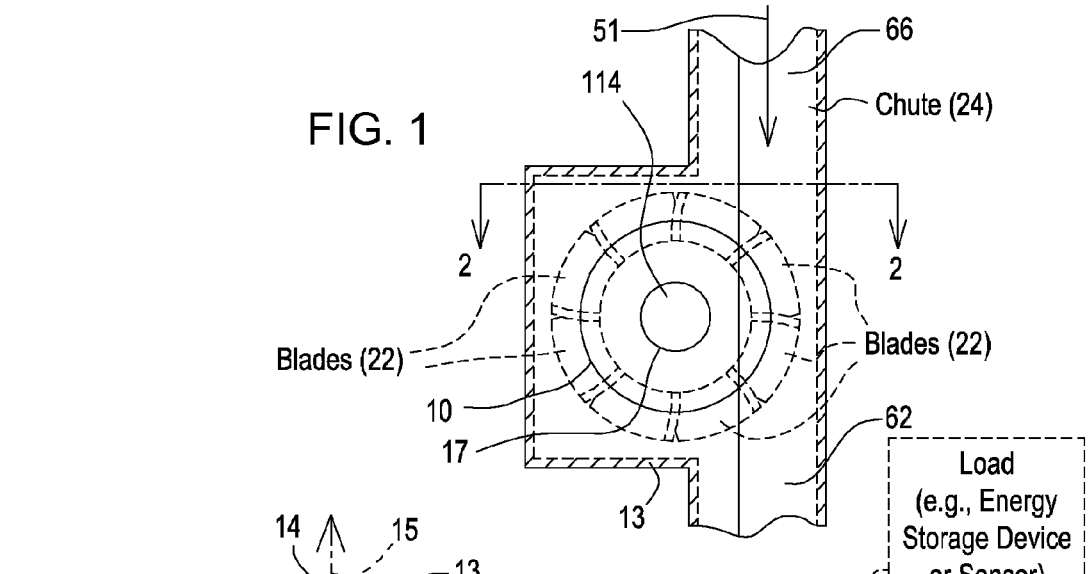
FIG. 1 is a cross section of a machine for generating electrical energy in accordance with the disclosure.
Figure 2:
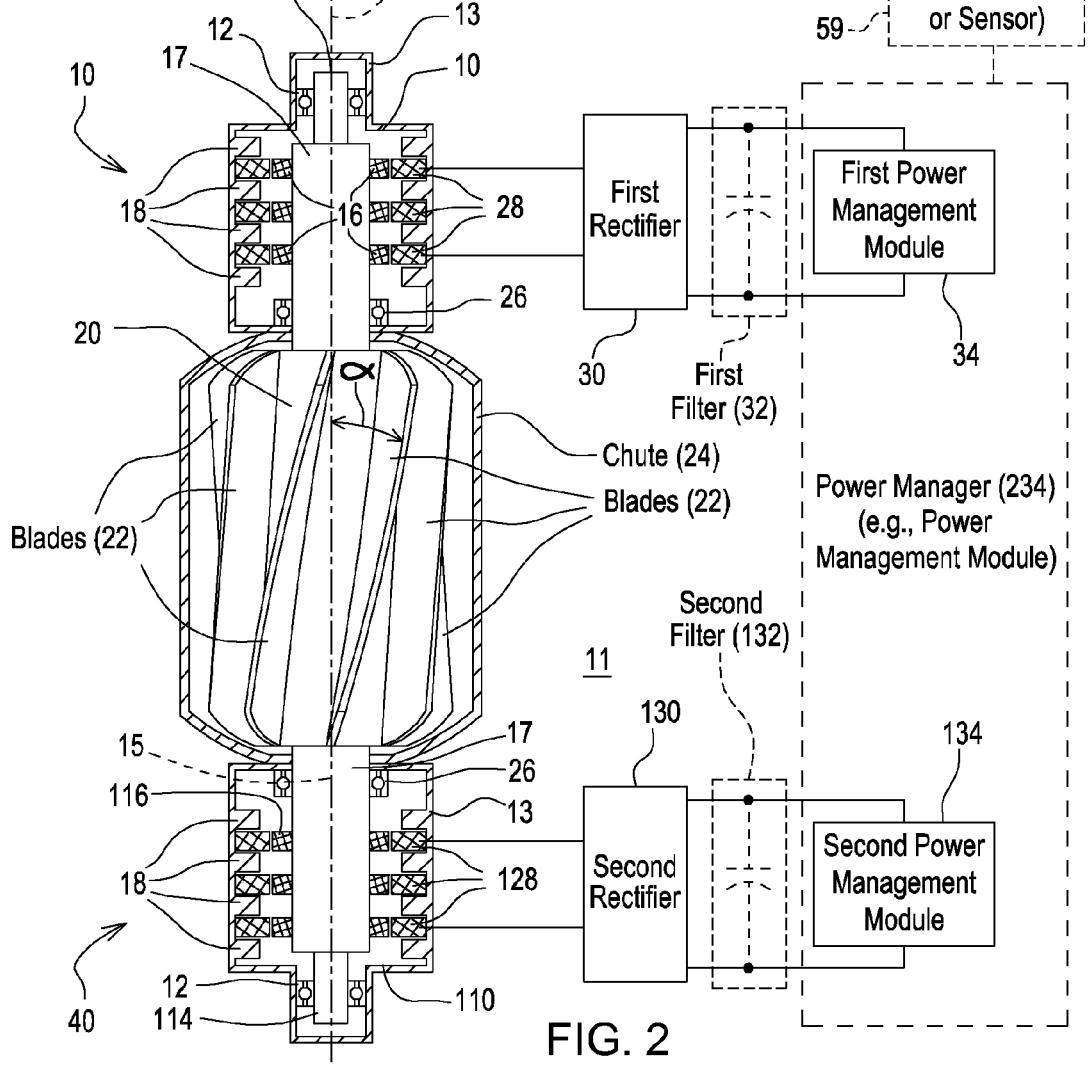
FIG. 2 shows a cross section of the machine taken along reference line 2-2 of FIG. 1, where the impeller and blades are shown in perspective view, and where associated circuitry is shown in a block diagram.

In accordance with one embodiment, FIG. 1 and FIG. 2 show an alternator, generator or a machine 11 for generating electrical energy. The machine 11 comprises a housing 13 and a shaft 17 rotatable about an axis 15 with respect to the housing 13. One or more outer bearings 12 and one or more inner bearings 26 are secured to the housing 13 and are associated with the shaft 17 to support the shaft 17 and allow rotation of the shaft 17 with respect to the housing 13. Although four bearings (12, 26) are illustrated in the embodiment of FIG. 2, two or more bearings spaced apart can be used in alternate embodiments, and such alternate embodiments fall within the scope of the claims.

An impeller 20 has blades 22 for rotation with the shaft 17 about the axis 15 in response to receipt of material (e.g., harvested material) from a chute 24. A first end 14 of the shaft 17 is associated with a first generator assembly 10, whereas a second end 114 of the shaft 17 is associated with a second generator assembly 110. FIG. 1 is shown as a cross-section from the perspective of facing the second end 114 of the shaft 17.

A first generator assembly 10 comprises first stator windings 28 associated with the housing 13 and a first magnet 16 (e.g., first magnet assembly) affixed to the shaft 17, such that if the impeller 20 rotates an electromagnetic signal energizes the first stator windings 28 in response to the flow of material through the chute 24. In the first stator windings 28, the electromagnetic signal is induced by the rotating magnetic field of the first magnet 16. The shaft 17 has a shaft axis 15 that is generally perpendicular to a direction of flow of the material through the chute 24.

In one embodiment, the first stator windings 28 may be inserted between one or more interior protrusions 18 of the housing 13. The first stator windings 28 may be secured to the housing 13 via one or more protrusions 18, or otherwise attached to the housing 13 and electrically insulated from the housing 13.

In one configuration, the first magnet 16 comprises a first magnet assembly with a set of magnets attached to the shaft 17 and spaced apart at differential radial angles with respect to the shaft 17. For instance, the first magnet 16 may comprise a first magnet assembly with sets of magnets spaced apart on the shaft 17 at different axial positions and at different radial positions, as illustrated in FIG. 2.

Referring to FIG. 2, a second generator assembly 110 comprises second stator windings 128 associated with the housing 13 and a second magnet 116 (e.g., second magnet assembly) affixed to the shaft 17, such that if the impeller 20 rotates an electromagnetic signal energizes the second stator windings 128 based on the flow of material through the chute 24. In the second stator windings 128, the rotating magnetic field of the second magnet 116 induces the electromagnetic signal.

In one embodiment, the second stator windings 128 may be inserted between one or more interior protrusions 18 of the housing. The second stator windings 128 may be secured to the housing 13 via one or more protrusions 18, or otherwise attached to the housing 13 and electrically insulated from the housing 13.

In one configuration, the second magnet 116 comprises a second magnet assembly with a set of magnets attached to the shaft 17 and spaced apart at differential radial angles with respect to the shaft 17. For instance, the second magnet 116 may comprise a first magnet assembly with sets of magnets spaced apart on the shaft 17 at different axial positions and at different radial positions, as illustrated in FIG. 2.

FIG. 2 shows a cross section of the machine 11 taken along reference line 2-2 of FIG. 1, where the impeller 20 and blades 22 are shown in perspective view, and where associated circuitry is shown in a block diagram.

With respect to the impeller 20 and its blades 22, the impeller 20 may be configured as a paddle wheel where the impeller blades 22 are tilted at an angular offset a with respect to a rotational axis 15 of the shaft 17. For example, the blades 22 of the impeller 20 are arranged in a paddle wheel configuration with sloped blades 22, where each of the sloped blades 22 has a slope angle α with respect to a rotational axis of the shaft 17 to facilitate passage or drainage of the material through the chute 24 by gravity and/or a motive force provided by an auger (e.g., 55 in FIG. 3). As best illustrated in FIG. 1, the housing 13 around the impeller 20 has an inlet 66 and an outlet 62 for attachment to the chute 24, where arrow 51 illustrates the direction of flow of the material through the chute 24 around the blades 22. As illustrated the housing section (e.g., 13) around the impeller 20 has a larger cross-sectional area than the remainder of the chute 24, although the impeller 20 can be made more compact with a cross-sectional area that is approximately equal to the remainder of the chute 24 in alternate configurations.

FIG. 2 illustrates circuitry associated with the alternator, generator or machine 11 for generating electrical energy in a block diagram. In FIG. 2, the block diagram portion shows a first rectifier 30 coupled to the first stator windings 28 for converting the electromagnetic signal (e.g., alternating current signal) into a direct current signal. The first stator windings 28 may comprise one or more coils or inductors that are connected in series or in parallel, for example.

An optional first filter 32 is coupled to the first rectifier 30. The optional filter is shown as dashed lines to indicate that it is optional and may be deleted in alternate embodiments. In turn, the first filter 32 (or first rectifier 30) is coupled to a first power management module 34. The optional first filter 32 (if present) is adapted to filter the direct current signal.

The first power management module 34 is configured for storing, processing, switching, load matching, impedance adjusting, voltage setting, current setting, or otherwise managing the direct current signal. In one embodiment, a first output of a direct current output signal from the first power management module 34 may be coupled to an optional load 59. The optional load 59 may comprise one or more of the following: a battery, an energy storage device, a sensor, an electrical circuit, or an accessory.

In one embodiment, the first rectifier 30 comprises a bridge rectifier, a full-wave rectifier, a half-wave rectifier, or a circuit of one or more diodes. A half-wave rectifier comprises a diode that is placed in series with one of the terminals from the first stator windings 28 such that a positive or negative portion (e.g., positive sine wave portion) of the electromagnetic signal can be provided to the first power management module 34, the power management module 234, or an optional load 59 (e.g., battery), for example.

In one configuration, the first filter 32 comprises one or more of the following: a capacitor, an electrolytic capacitor, a low pass filter that rejects electromagnetic signals in a band above direct current or zero Hertz, or a tuned network of capacitors and inductors. For instance, the first filter 32 (e.g., capacitor) is placed in parallel across the output of the first rectifier 30 or one output terminal of the first rectifier 30 and a terminal of the first stator windings 28. The first filter 32 is optional as indicated by the dashed lines in FIG. 2.

A second rectifier 130 is coupled to the second stator windings 128 for converting the electromagnetic signal (e.g., alternating current signal) into a direct current signal. The second stator windings 128 may comprise one or more coils or inductors connected in series or parallel, for example. An optional second filter 132 is coupled to the second rectifier 130. The second filter 132 is shown in dashed lines because it is optional and can be deleted. In turn, the optional second filter 132 (or second rectifier 130) is coupled to a second power management module 134. The second filter 132 is adapted to filter the direct current signal. The second power management module 134 is configured for storing or managing the direct current signal.

In one embodiment, the second rectifier 130 comprises a bridge rectifier, a full-wave rectifier, a half-wave rectifier, or a circuit of one or more diodes. A half-wave rectifier comprises a diode that is placed in series with one of the terminals from the second stator windings such that a positive or negative portion (e.g., positive sine wave portion) of the electromagnetic signal can be provided to the power management module or a load (e.g., battery), for example.

In one configuration, the second filter 132 comprises one or more of the following: a capacitor, an electrolytic capacitor, a low pass filter that rejects electromagnetic signals in a band above direct current or zero Hertz, or a tuned network of capacitors and inductors. For instance, the second filter 132 (e.g., capacitor) is placed in parallel across the output of the rectifier or one output terminal of the second rectifier 130 and a terminal of the second stator windings 128. The second filter 132 is optional as indicated by the dashed lines in FIG. 2.

The first power management module 134 is configured for storing, processing, switching, load matching, impedance adjusting, voltage setting, current setting, or otherwise managing the direct current signal. In one embodiment, a second output of a direct current output signal from second first power management module 134 may be coupled to an optional load 59 (e.g., battery or energy storage device).

In one embodiment, the power manager 234 or the power management module comprises the first power management module 34, the second power management module 134, or both. In one illustrative configuration, the power manager 234 may comprise one or more switches that connects or disconnects both output terminals of the first filter 32, the second filter 132, or both to an electrical load 59 or circuit (e.g., battery, sensor or accessory). For example, the switches may be configured as a single pole, single throw switch or a double pole, single throw switch to manage the output from either the first filter 30, or the second filter 132. In one configuration, the power manager 234 or the power management module may select alternately the output of the first rectifier 30 and the second rectifier 132, where each is a half-wave rectifier of opposite polarity output, to output a full-wave rectified output signal to an electrical load.

Alternatively, the power manager 234 or its switches may be configured to place or configure the generator output terminals of the first generator assembly 10 and the second generator assembly 110 in parallel or in series with each other; particularly, where each of the first rectifier 30 and the second rectifier 130 comprise full-wave or bridge rectifiers. The generator output terminals refer to the output terminals of the first rectifier 30, the second rectifier 130, with or without filters (32, 132).

Where the rectifiers (30, 130) are full-wave rectifiers, the power manager 234 may place the first generator output terminal of the first generator assembly 10 in parallel with the second generator output terminal of the second generator assembly 110 to produce greater current or maximum generated current at the output for application to an electrical load. Alternatively, the power manager 234 may place the first generator output terminal of the first generator assembly 10 in series with the second generator output terminal of the second generator assembly 110 to produce a greater voltage or a maximum generated voltage at the output for application to an electrical load 59. From time-to-time based on fluctuations in the load 59 or the nature of the load 59, the power manager 234 may switch between the above series and parallel configurations to match the voltage or current requirements of the electrical load to the corresponding electrical characteristics of the generated electrical energy. For example, the electrical load 59 is a battery with a nominal voltage of X volts direct current, the power manager 234 may need to place the generator output terminals of the first generator assembly 10 and the second generator assembly 110 in series to generate a voltage equal to or greater than X to charge the battery, assuming the current output is adequate, for instance.

In one embodiment, the direct current signal at the output of the power manager 234 is coupled to an optional load 59 an electrical energy storage device. In another embodiment, the direct current signal or the power management module can be coupled to a sensor as an optional load to provide electrical energy for the sensor as an electrical load 59.

The optional load 59 is optional as is indicated by the dashed lines. In an alternate embodiment, the optional load may be deleted. For example, if the optional load 59 is deleted, the outputted direct current signal (from the power manager 234) has a voltage or current that is indicative of a rate of flow of material through the chute 24 such that the machine for generating electrical energy functions as a material flow sensor, a material flow rate sensor, a grain flow sensor, or a grain flow rate sensor. For example, the higher the output voltage (from output terminal(s) of the power manager 234), the greater is the flow of harvested material through the machine 11 via the inlet and outlet.

Figure 3:
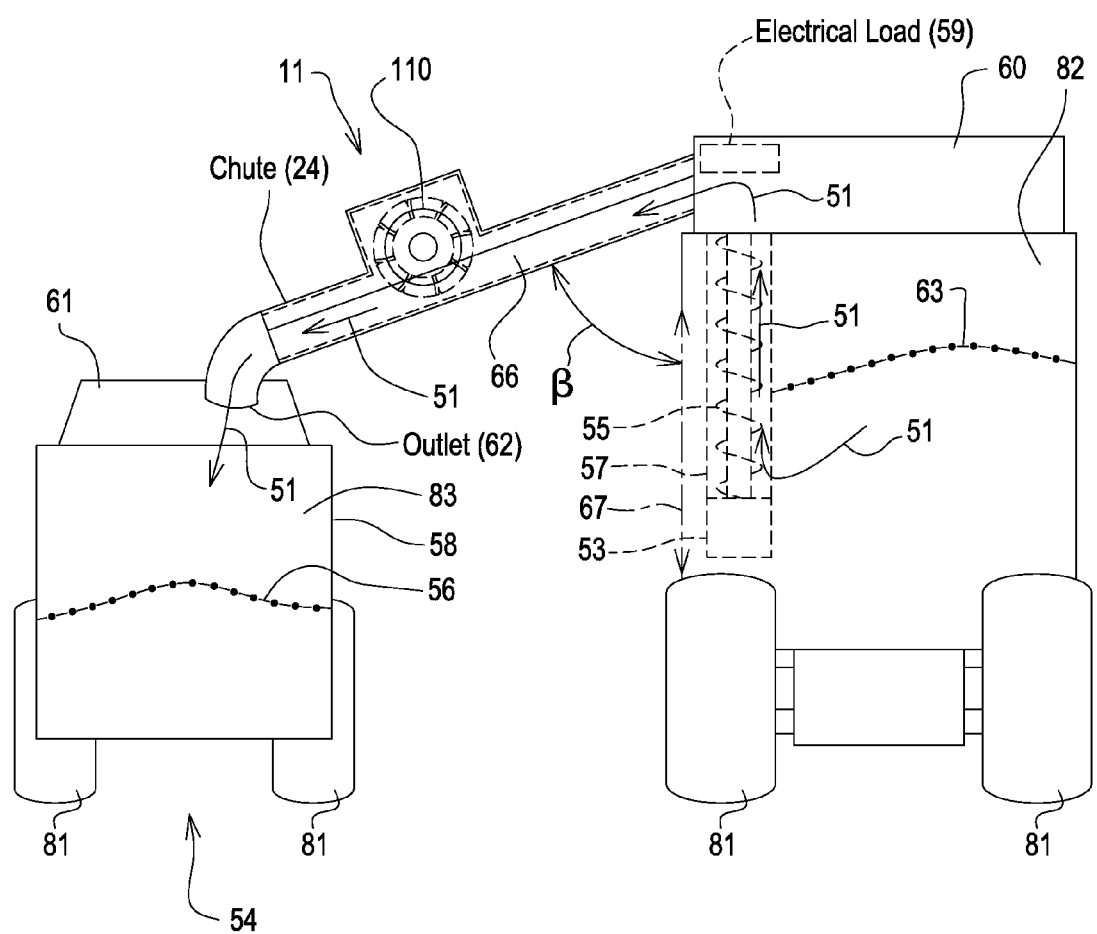
FIG. 3 shows the machine for generating electrical energy installed on the chute of a combine or harvester.

In FIG. 3, a combine 60 or harvester harvests a crop, plant or other material. The combine 60 or harvester transfers the harvested material from the combine 60 or harvester to a receiving vehicle 61, such as a cart 58 (e.g., grain cart), via the chute 24. In one embodiment, the combine 60 or harvester has an auger 55 for conveying material 63 from a bin 82 (e.g., grain tank) to the receiving vehicle 61 via the chute 24. For example, the harvested material comprises an agricultural material selected from the group consisting of corn, grain, soybeans, oilseed, wheat, barley, oats, rice, cotton, fiber, stover, forage or other plant material. In the combine 60, the material height 63 or cross-sectional profile of the material is illustrated by the alternating dotted-and-dashed line. A propulsion unit 53 is capable of rotating the auger 55 to convey the material from the bin 82 in the direction shown by the arrows 51. The auger 55 is mounted in and can rotate with respect to channel 57. As shown the chute 24 makes an angle β with respect to a vertical axis 67 or the side of the combine 60. The combine 60 or harvester and the grain cart 61 may have wheels 81, such that the combine 60 or harvester may both harvest and transfer harvested material to the receiving vehicle 61 while both the combine 60 (or harvester) and the receiving vehicle 61 are moving along similar coordinated or parallel paths in substantially the same direction of travel. In the interior 83 of the cart 58, the material height 56 or cross-sectional profile of the material is illustrated by the alternating dotted-and-dashed line.

In alternate embodiments, the machine (11) may be embodied as a combination of any independent claim and one or more features of any dependent claim thereon, where any features from one or more dependent claims may be incorporated cumulatively or separately into any independent claim upon which the dependent claims or its features depend or are otherwise supported by the disclosure.

Having described the preferred embodiment, it will become apparent that various modifications can be made without departing from the scope of the invention as defined in the accompanying claims.

The following is claimed:

1. A machine for generating electrical energy, the machine comprising:
a housing;
a shaft rotatable with respect to the housing;
an impeller with blades for rotation with the shaft in response to receipt of material from a chute, wherein the chute makes an angle with respect to a vertical axis;
a first generator assembly comprising first stator windings associated with the housing and a first magnet affixed to the shaft, such that if the impeller rotates an electromagnetic signal energizes the first stator windings based on the flow of material through the chute.

2. The machine according to claim 1 further comprising:
a first rectifier coupled to the first stator windings for converting the electromagnetic signal into a direct current signal;
a first filter for filtering the direct current signal; and
a first power management module for storing or managing the direct current signal.

3. The machine according to claim 2 wherein the direct current signal is coupled to an electrical energy storage device.

4. The machine according to claim 2 wherein the direct current signal has a voltage or current that is indicative of a rate of flow of material through the chute.

5. The machine according to claim 2 wherein the direct current signal or the power management module is coupled to a sensor.

6. The machine according to claim 1 further comprising:
a second generator assembly comprising second stator windings associated with the housing and a second magnet affixed to the shaft, such that if the impeller rotates an electromagnetic signal energizes the second stator windings based on the flow of material through the chute.

7. The machine according to claim 6 further comprising:
a second rectifier coupled to the second stator windings for converting the electromagnetic signal into a direct current signal;
a second filter for filtering the direct current signal;
a second power management module for storing or managing the direct current signal.

8. The machine according to claim 1 wherein the material comprises an agricultural material selected from the group consisting of corn, grain, soybeans, oilseed, wheat, and barley.

9. The machine according to claim 1 wherein the shaft has a shaft axis that is generally perpendicular to a direction of flow of the material through the chute.

10. The machine according to claim 1 wherein the blades of the impeller are arranged in a paddle wheel configuration with sloped blades, where each of the sloped blades has a slope angle with respect to a rotational axis of the shaft to facilitate passage or drainage of the material through the chute by gravity.

11. The machine according to claim 1 wherein a plurality of bearings support the shaft in the housing for rotation of the shaft with respect to the housing.

12. A harvester for harvesting an agricultural material, the harvester comprising:
a chute for unloading or transferring the agricultural material from the harvester, wherein the chute makes an angle with respect to a vertical axis of the harvester;
an electrical energy generator associated with the chute, wherein the electrical energy generator comprises:
a housing;
a shaft rotatable with respect to the housing;
an impeller with blades for rotation with the shaft in response to receipt of material from a chute;
a first generator assembly comprising first stator windings associated with the housing and a first magnet affixed to the shaft, such that if the impeller rotates an electromagnetic signal energizes the first stator windings based on the flow of material through the chute.

13. The harvester according to claim 12 further comprising:
- a first rectifier coupled to the first stator windings for converting the electromagnetic signal into a direct current signal;
- a first filter for filtering the direct current signal; and
- a first power management module for storing or managing the direct current signal.

14. The harvester according to claim 13 wherein the direct current signal is coupled to an electrical energy storage device.

15. The harvester according to claim 13 wherein the direct current signal has a voltage or current that is indicative of a rate of flow of material through the chute.

16. The harvester according to claim 13 wherein the direct current signal or the power management module is coupled to a sensor.

17. The harvester according to claim 12 further comprising:
- a second generator assembly comprising second stator windings associated with the housing and a second magnet affixed to the shaft, such that if the impeller rotates an electromagnetic signal energizes the second stator windings based on the flow of material through the chute.

18. The harvester according to claim 17 further comprising:
- a second rectifier coupled to the second stator windings for converting the electromagnetic signal into a direct current signal;
- a second filter for filtering the direct current signal;
- a second power management module for storing or managing the direct current signal.

19. The harvester according to claim 12 wherein the material comprises an agricultural material selected from the group consisting of corn, grain, soybeans, oilseed, wheat, and barley.

20. The harvester according to claim 12 wherein the shaft has a shaft axis that is generally perpendicular to a direction of flow of the material through the chute.

* * * * *